April 23, 1929.　　　　G. S. AGEE　　　　1,710,286

SAW GUIDE

Filed Dec. 24, 1926

George S. Agee Inventor

By C. A. Snow & Co.
Attorneys.

Patented Apr. 23, 1929.

1,710,286

UNITED STATES PATENT OFFICE.

GEORGE S. AGEE, OF LONGVIEW, WASHINGTON.

SAW GUIDE.

Application filed December 24, 1926. Serial No. 156,907.

This invention relates to a guide designed primarily for use in connection with circular saws, one of the objects being to provide a device of this character so shaped as to prevent the accumulation of small slivers and chunks around the periphery of the saw where they are likely to produce such excessive friction as to heat or even burn the saw.

A further object is to provide a guide which will act to steady the lumber until it is properly engaged by the saw, the guide being so inclined that, should any cut or broken chunks be fed towards the saw, they would not hang or become lodged where they would interfere with the feeding of lumber but, on the contrary, would shift by gravity away from the periphery of the saw.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings.

Figure 1:
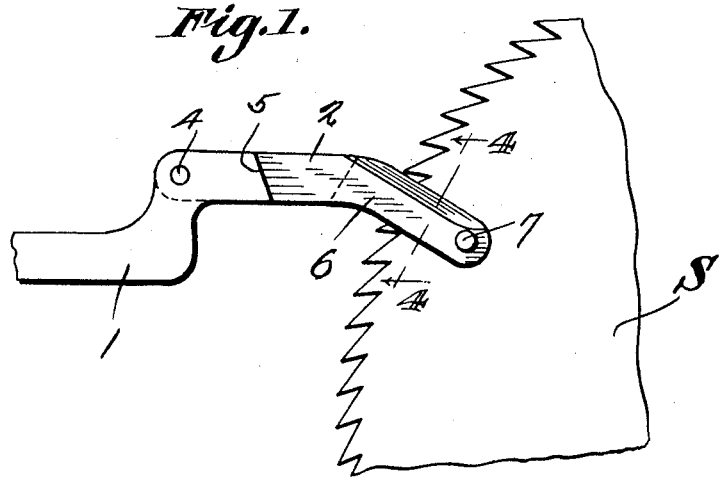
Figure 1 is a side elevation of a portion of a circular saw having the present improvements combined therewith.
Figure 2:
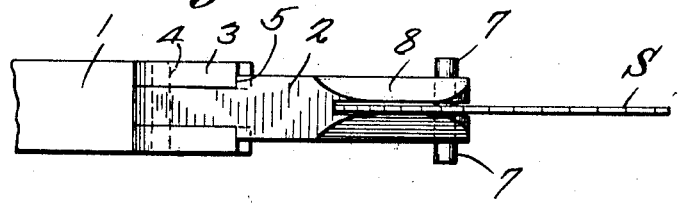
Figure 2 is a plan view of the structure shown in Figure 1.
Figure 3:
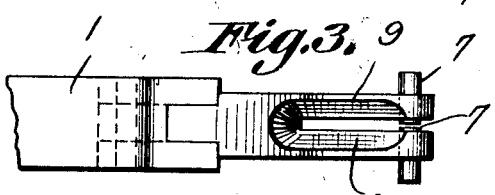
Figure 3 is a bottom plan view of the guide.
Figure 4:
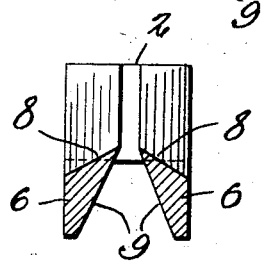
Figure 4 is an enlarged section on line 4—4, Figure 1.

Referring to the figures by characters of reference 1 designates a forked support for lumber being fed to a saw S and pivotally mounted within this fork is the guide constituting the present invention. This guide includes a finger 2 extending into the fork 3 and attached thereto by means of a pivot pin 4. While I prefer the style shown, my invention may be attached to the shifter heads by any of the devices now in use on ordinary guides. The finger has lateral shoulders 5 adapted to bear against the free end of the fork so as to limit the downward movement of the finger relative to the structure 1. The finger extends close to the toothed periphery of the saw S and then merges into downwardly inclined jaws 6 spaced apart a sufficient distance to allow the saw S to work freely therebetween. The jaws are provided, near their free ends, with laterally extending pins 7 terminating close to opposed faces of the saw so as to hold the jaws properly positioned laterally relative to the saw. Those portions of the jaws at the sides of the saw are inclined downwardly and laterally as shown at 8 so that chips or the like deposited on the upper faces of the jaws will be caused to gravitate laterally away from the saw and not become lodged on the jaws. The lower faces of the jaws are cut away as shown at 9 so as to provide faces extending downwardly and laterally from the inner edges of the upper inclined faces 8. Thus an ample clearance is provided at each side of the saw so that loose material cannot pack between the saw and the jaws and set up friction such as frequently results in the overheating and burning of a saw.

Should any long slivers pass between the jaws, one end of each sliver will generally come against one of the pins so that the sliver will thus be swung upwardly where it will be struck by the next piece of lumber and driven forward and out of the jaws, so as not to interfere with the feeding of stock to the saw.

As the device is automatically self clearing many of the disadvantages incident to the use of the ordinary guides are eliminated.

What is claimed is:

The combination with a lumber support, of a finger pivotally connected thereto, cooperating means on the support and finger for holding said finger normally flush with the support to guide lumber to a saw, a pair of downwardly inclined jaws extending from the finger providing a saw receiving space therebetween, the upper edges of the jaws being inclined downwardly and laterally away from the saw thereby to shed chips laterally and longitudinally away from the jaw, each jaw having its under surface inclined downwardly and laterally from the saw receiving space, and a pin extending through the free end portion of each jaw and projecting beyond opposed faces of the jaw.

In testimony that I claim the foregoing as my own, I have hereto affixed my signature.

GEORGE S. AGEE.